United States Patent [19]

Juditzki

[11] 4,034,904

[45] July 12, 1977

[54] TWIN-BELT TRANSPORT SYSTEM

[75] Inventor: Franz Juditzki, Kreuztal-Buschhutten, Germany

[73] Assignee: Hoesch Aktiengesellschaft, Dortmund, Germany

[21] Appl. No.: 709,259

[22] Filed: July 28, 1976

[30] Foreign Application Priority Data

Aug. 8, 1975 Germany .................. 2535414

[51] Int. Cl.² ..................... B65H 17/34
[52] U.S. Cl. .................. 226/1; 100/154; 226/172
[58] Field of Search ......... 226/170, 171, 172, 173, 226/1; 100/151, 153, 154

[56] References Cited

U.S. PATENT DOCUMENTS

| 3,521,552 | 7/1970 | Knapp | 100/154 X |
| 3,915,291 | 10/1975 | Vogts | 226/172 X |

Primary Examiner—Richard A. Schacher
Attorney, Agent, or Firm—Michael J. Striker

[57] ABSTRACT

A transport system for producing panels of synthetic-resin foam sandwiched between a pair of skins comprises a pair of transport belts carried on a frame having respective parallel stretches each engaging a respective skin. The belts are driven at rates such that the stretches advance in a transport direction at a belt speed. A pair of roller chains is provided inside each of the belts with a plurality of rollers extending between each of these pairs of chains. These roller chains are connected to another drive system that advances the rollers counter to the transport direction in engagement with the stretches so as to minimize lateral deflection of the belts during production of a synthetic-resin panel formed by injecting a foamable synthetic resin between the skins and allowing it to harden while it moves between the working stretches.

10 Claims, 4 Drawing Figures

TWIN-BELT TRANSPORT SYSTEM

BACKGROUND OF THE INVENTION

The present invention relates to a transport system. More particularly this invention concerns a transport method and apparatus used in a system that produces rigid sandwich panels of synthetic-resin material.

It is known to produce a rigid panel by injecting a mass of foamable synthetic-resin material between a pair of foils or skins. These skins are held apart at a predetermined fixed spacing while the synthetic-resin mass foams and completely fills the space between them. During such foaming it is essential that the skins be held perfectly flat so that the finished board or panel will also be perfectly flat.

In the continuous production of such boards the foils or skins are pulled off of supply rolls and then pulled between a so-called two-belt transport system. Such a system comprises a pair of endless belts made of hard synthetic-resin material or of steel which are moved in the production or transport direction at a predetermined speed and which have stretches that are exactly parallel to each other and spaced apart by the desired panel thickness. Since the pressure exerted by the foaming synthetic-resin material between the skins is considerable it is necessary to support the juxtaposed stretches of the transport belt by means such as rollers as described in the publication Kunststoffe (1968, volume 2, page 120). In such an arrangement an array of rollers extending perpendicular to the transport direction engage against the stretches on the faces thereof opposite the workpiece. These rollers are driven by the transport belt at a peripheral speed corresponding to the production rate so that the working stretches of the transport belts are firmly supported.

Such a system has the disadvantage that, since the contact between each of the rollers and the back of the corresponding stretch of the corresponding transport belt is effectively line contact, there are still unsupported regions of the belt stretches. It is therefore possible for the belt to bow out or deform outwardly in these unsupported regions. Such bowing-out can be minimized by placing the rollers as close as is physically possible. It is further possible to minimize the effects of such deformation by operating with the greatest possible transport speed. Thus between the time when the synthetic-resin mass is relatively plastic within the panel and the time when it is completely rigid, enough of the rollers will have been passed over to prevent the formation of excessive ripples or the like. Nevertheless it is noted that in some fast-setting resins the surface of the board will come out with a rippled surface.

In case the production line must be shut down temporarily in such a system the board that is at the moment pinched between the working stretches of the twin-belt transport system invariably has such a heavily rippled surfaces that it must be discarded. It is also noted that occasionally the extreme pressure exerted by the synthetic-resin mass will form ridges that are capable of damaging the machine when it is started up again.

SUMMARY OF THE INVENTION

It is therefore an object of the present invention to provide an improved transport system and method.

Another object is the provision of an improved twin-belt transport system for producing panels of synthetic-resin foam sandwiched between a pair of skins.

Another object is to provide an improved system and method which overcome the above-given disadvantages, preventing the formation of ridges on the panel even if the production line must be temporarily stopped.

These objects are attained according to the present invention by mounting the support rollers on endless support elements that are then driven so as to displace these rollers counter to the transport direction. Thus with such a system the effective distance between a pair of rollers is greatly reduced, as given a fixed location on the workpiece the effect of the sweeping rollers on it is as if there were many times more rollers spaced much more closely together than they really are. Thus it is possible to obtain an extremely accurate planarity in the calibrating or pressure-receiving space between the working stretches of the pair of transport belts.

According to another feature of this invention the advance rate counter to the transport direction of the rollers is controlled through a separately variable transmission from a separate roller drive. Such an arrangement allows the roller advance rate to be increased considerably in case of work stoppage so as to insure that the work piece held in the calibrating state is maintained perfectly flat.

According to another feature of this invention downstream of each of the array of rollers there is provided bearing against the back face of the working stretch of each transport belt a plurality of fixed support rollers. Thus it is possible in this region where the finished shape of the workpiece has been almost completely established to operate with substantially less expensive support means.

In accordance with yet another feature of the present invention each of the belts is wrapped around a drive roller at one end and at the other end around an idler roller which may be vertically displaced between any of a plurality of positions. Thus, it is possible to make the roller stretches extend exactly parallel to one another upstream of the moving support rollers or it is possible to tip the extreme upstream ends of these stretches so as to form a flaring mouth open in the upstream direction. In addition it is possible to replace the typical input roller with the movable rollers in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SPECIFIC DESCRIPTION OF PREFERRED EMBODIMENTS

Figure 1:
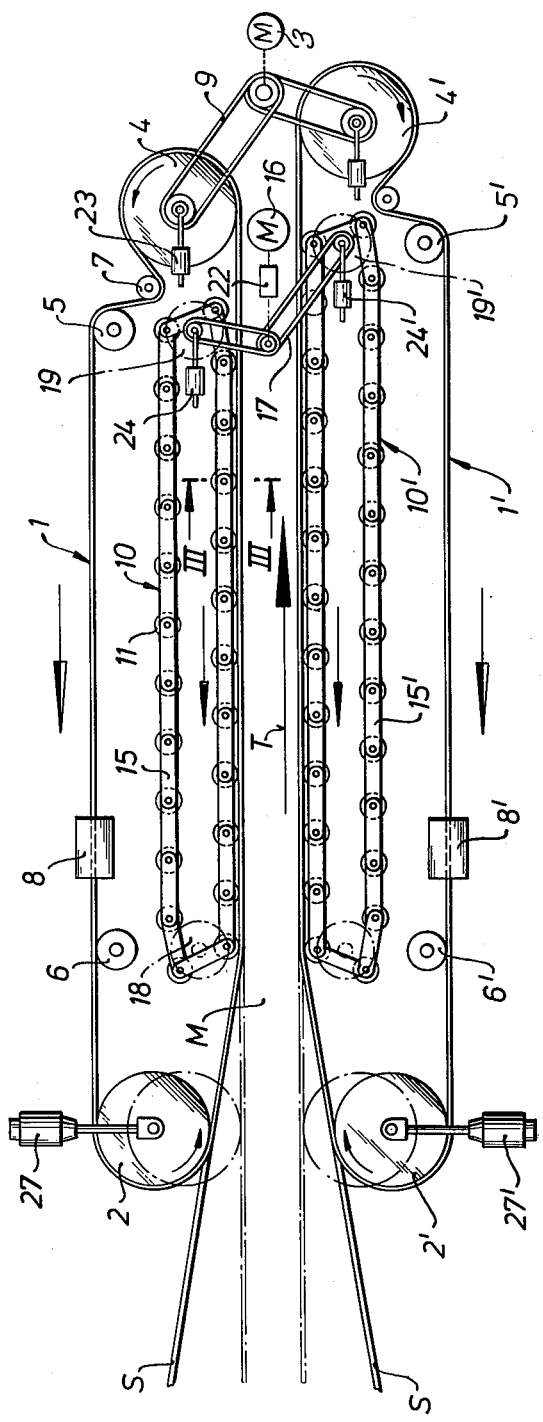
FIG. 1 is a side largely diagrammatic view of a system according to the invention for carrying out the method in accordance with this invention.

As shown in FIG. 1 the twin-belt system according to this invention has an upper and a lower belt 1 and 1'. All of the structure in this system is exactly and symmetrically duplicated for the lower belt 1' so that hereinafter the description will only refer to the upper belt 1 and the associated mechanism in most cases, it being understood that such description similarly applies to the lower belt 1'.

The belt 1 is spanned over an upstream idler roller 2 and a downstream drive roller 4, the latter being driven synchronously with the other roller 4' through a chain drive 9 by means of a common drive motor 3.

The idler 2 may be vertically displaced between the illustrated solid-line position and the dash-line position by means of a cylinder 27. Thus it is possible for the two rollers 2 and 2' to define a mouth flared in the downstream direction or to merely cause the extreme upstream stretches of the belts 1 and 1' to extend parallel to each other. In such an arrangement a pair of skins S pulled of respective supplies are pulled between the rollers 2 and 2' and a mass M of foamable synthetic-resin material is injected between these skins S so as to form a panel. One of the rollers 2 or 2' may be in the solid-line position and the other in the dash-line position, as desired.

The belt 1 is also spanned over further guide or idler rollers 5 and 6, and under a tensioning roller 7. A cylinder 23 is provided effective on the roller 4 to maintain the belt 1 tight. Furthermore, an edge-guiding arrangement 8 is provided at the upper reach or stretch of the belt 1 in order to exactly position it.

The belt 1 has a lower horizontally extending stretch that defines with the corresponding upper horizontally extending stretch of the belt 1' the calibration or working space. Belt 1 bears at this stretch against a support arrangement 10 formed about a multiplicity of rollers 11 carried on a chain 15 spanned over an upstream idler roller 18 and a downstream drive roller or sprocket 19. Each of these rollers 11 is formed as a cylindrical steel tube 12 supported via bearings 13 on a shaft 26 itself supported via rollers or bearings 25 on support surfaces 14 formed on the frame of the apparatus. These shafts 26 extend perpendicular to the transport direction T and are secured at their ends in the chain 15, and may indeed constitute the pivots for the chain links. The guides 14 extend exactly parallel to the lower stretch of the belt 1 so as to prevent vertical deformation of the rollers 11.

A drive motor 16 is connected to a variable transmission 22 and a chain drive 17 to the two drive rollers 19 and 19' whose positions horizontally can be established by cylinders 24 in order to keep the chains 15 and 15' tight. The motor 16 is effective on the support arrangements 10 so that the rollers 11 in engagement with the belt 1 move in a direction counter to the transport direction T.

Figure 2:
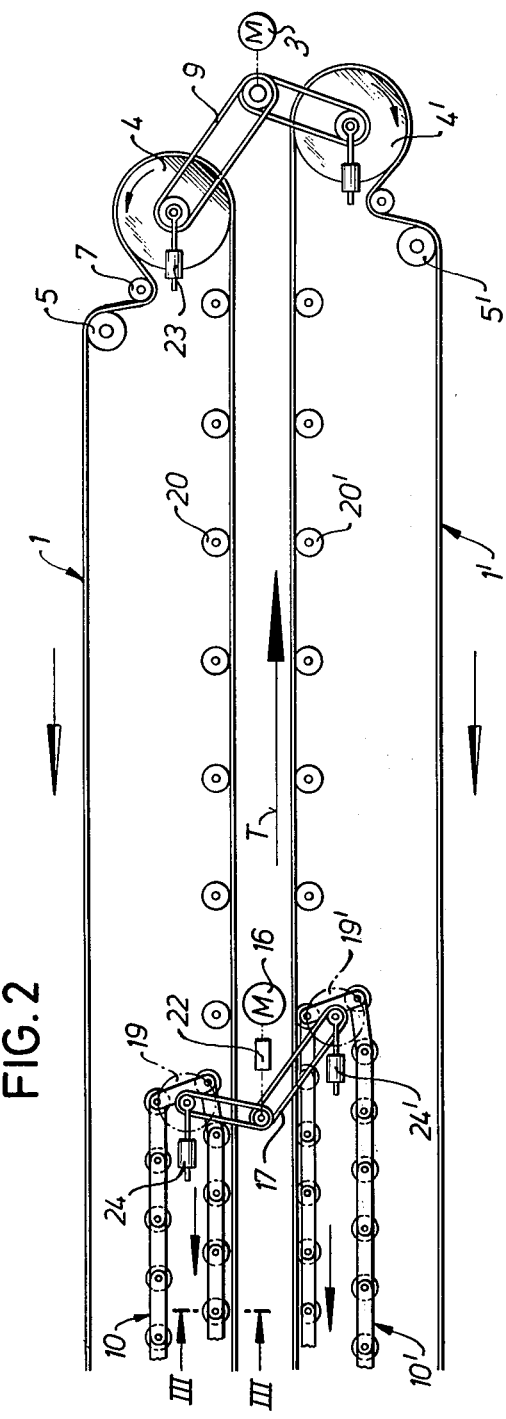
FIG. 2 is a large-scale diagrammatic side view of the downstream portion of a detail of the system of FIG. 1.
Figure 3:
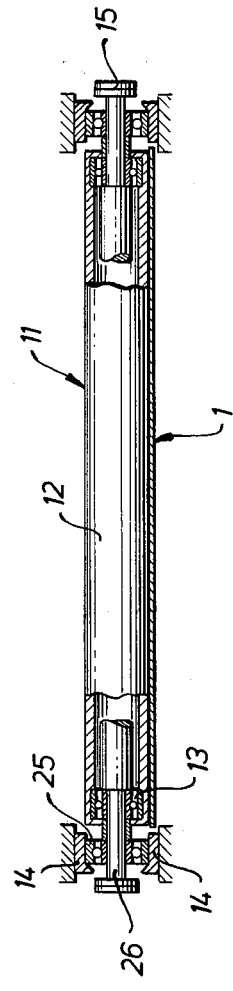
FIG. 3 is a section taken along line III—III of FIG. 1.

FIG. 2 shows how the downstream drive rollers 19 and 19' for the support roller arrangements 10 and 10' can be spaced by a considerable distance from the downstream drive rollers 4 and 4' of the belts 1 and 1'. In this intermediate distance the belts 1 and 1' are supported by nondisplaceable rotatable support rollers 20 and 20', since by the time the workpiece has arrived at this downstream region the synthetic-resin mass M in it is substantially set and no longer foaming. Such a construction allows the workpiece to be supported as it further cools, but saves in equipment expense by not supporting the belts 1 and 1' in its region with the complicated roller arrangements 10 and 10'.

Figure 4:
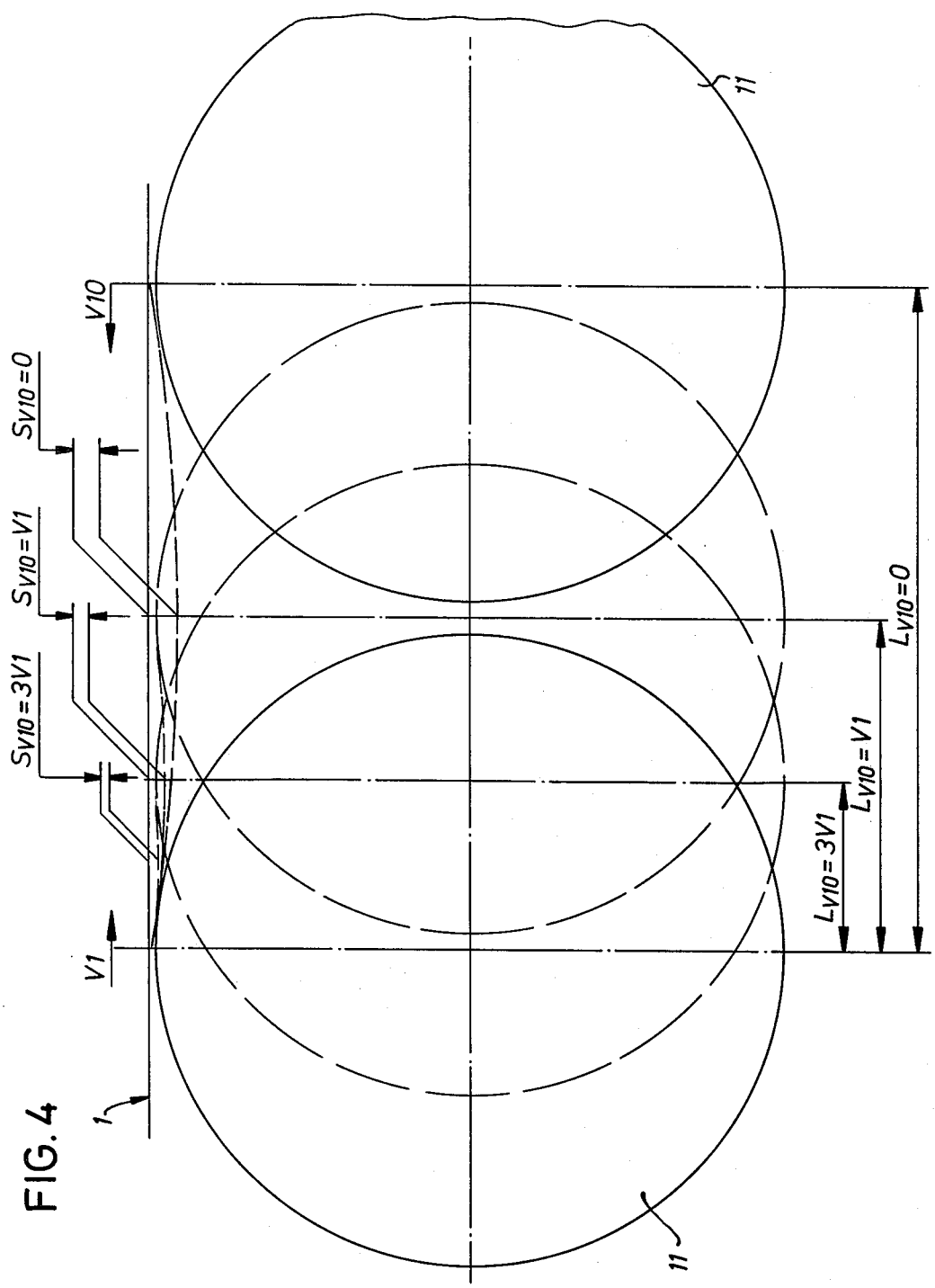
FIG. 4 is a diagrammatic view illustrating the operation of the system in accordance with this invention.

FIG. 4 shows the changes in the deflection of the band 1 caused by the swelling of the workpiece between the rollers 11 with a counterrotating roller arrangement. This deflection is shown to diminish as the roller speed increases.

The support length L and the corresponding deflection S is related to the transport speed V1 toward the right and the opposite speed V10 toward the left of the rollers 11.

It can be seen that the deflection S is greatest when the speed V10 of the rollers 11 is equal to zero, that is when the rollers 11 are stopped. When the speed V10 is equal to the advance speed V1 the deflection is reduced greatly, and when speed V10 is equal to three times the speed V1, there is practically no deflection possible. Thus in order not to exceed certain maximum deflection it is necessary to control the speed V10 in accordance with the speed V1. If V1 is increased V10 can be decreased and vice versa.

It will be understood that each of the elements described above, or two or more together, may also find a useful application in other types of system differing from the types described above.

While the invention has been illustrated and described as embodied in a two-belt transport system, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A transport system for producing panels of synthetic-resin foam sandwiched between a pair of skins, said system comprising: a frame; a pair of transport belts carried on said frame having respective parallel stretches each engaging a respective skin; belt drive means connected to said belts for advancing said stretches in a transport direction at a belt speed; at least one endless support element juxtaposed with each of said stretches; a plurality of rollers on each of said elements bearing against the face of the respective stretch turned away from the other stretch, said rollers being supported at said stretches on said frame; and roller drive means connected to each of said support elements for displacing said rollers in contact with said stretches counter to said transport direction.

2. The system defined in claim 1, further comprising means for steplessly varying the displacement speed of said rollers.

3. The system defined in claim 2, further comprising nondisplaceable but rotatable support rollers bearing against said faces of said stretches downstream of the first-mentioned rollers.

4. The system defined in claim 1, further comprising a respective idler wheel over which each of said belts is spanned and means for vertically positioning and displacing each of said idler wheels.

5. A transport system comprising: an endless belt having a straight stretch; belt drive means connected to said belt for displacing said stretch in a transport direction at a predetermined belt speed; an array of rollers engaging said stretch on a face thereof; and roller drive means for displacing said rollers along said stretch counter to said transport direction and at a predetermined roller speed.

6. The system defined in claim 5, further comprising at least one endless holding element connected to said roller drive means and carrying said rollers.

7. The system defined in claim 5, further comprising a second belt having a second stretch spaced from and parallel to the first-mentioned stretch of the first-mentioned belt, and a second array of rollers bearing on said second stretch, said belt and roller drive means being respectively connected to both of said belts and arrays for synchronous displacement thereof.

8. The system defined in claim 5 wherein said roller speed is at least as great as said transport speed.

9. In a method of displacing a workpiece wherein said workpiece is gripped between a stretch of a transport belt usually advancing in a transport direction at a belt speed and a surface spaced from said stretch and wherein the stretch is pressed by rollers against said workpiece, the improvement comprising the step of continuously displacing said rollers back over said stretch counter to said direction.

10. The improvement defined in claim 9 wherein said rollers are displaced in an endless path within said belt.

* * * * *

UNITED STATES PATENT AND TRADEMARK OFFICE
CERTIFICATE OF CORRECTION

PATENT NO. : 4,034,904
DATED : July 12, 1977
INVENTOR(S) : Franz Juditzki

It is certified that error appears in the above-identified patent and that said Letters Patent are hereby corrected as shown below:

In the heading [73], the name of the assignee should read -- Hoesch Werke Aktiengesellschaft --.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*